United States Patent Office 3,280,165
Patented Oct. 18, 1966

3,280,165
PROCESS FOR PREPARING NITRILES
Otto Scherer, Bad Soden, Taunus, and Klaus Uhl, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Feb. 18, 1964, Ser. No. 345,560
Claims priority, application Germany, Feb. 26, 1963, F 39,119
6 Claims. (Cl. 260—465.1)

The present invention provides a process for the manufacture of aliphatic nitriles, which comprises reacting an alkyl-aluminum compound of the general formula

in which alkyl stands for an alkyl group having 1 to 24 carbon atoms, X stands for an alkyl radical having 1 to 24 carbon atoms, a hydrogen atom, a halogen atom or an alkoxy group having 1 to 4 carbon atoms and Y represents an alkyl radical having 1 to 24 carbon atoms, a halogen atom or an alkoxy group having 1 to 4 carbon atoms, with a cyanogen halide (Hal—CN), preferably cyanogen chloride or cyanogen bromide, advantageously with the exclusion of oxygen, and eventually liberating the nitrile from the complex compound in the reaction product by means of water, oxygen, air or $SO_2$.

The reaction can be carried out in the absence or presence of inert solvents at a temperature in the range of from $-10°$ C. to $+120°$ C. It is preferable, however, to operate at a temperature ranging from $+10°$ C. to $+80°$ C. The time of reaction depends on the temperature applied. It is several days at $-10°$ C. and a few minutes at $+120°$ C. In the preferred temperature range of $+10°$ C. to $+80°$ C. the reaction takes about 30 minutes to 4 hours.

In the process of the present invention the following organo-aluminum compounds may be used: trimethylaluminum, triethylaluminum, tripropylaluminum, tri-n-dodecylaluminum, or mixtures of aluminum trialkyls as obtained as so-called growth products of various grades in the reaction described by K. Ziegler (cf. Liebig's Annalen, volume 629 (1960)):

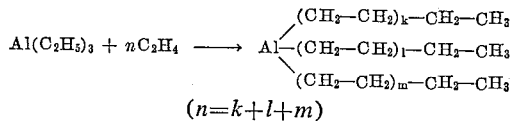

$(n=k+l+m)$

Besides the aluminum trialkyls there may likewise be used aluminum dialkyl hydrides, for example $$(i-C_4H_9)_2AlH$$

or compounds of the general formulae $$(alkyl)_2Al—Hal$$

and $$(alkyl)_2Al—O—alkyl$$

furthermore the so-called sesqui compounds and mono-alkyl-aluminum compounds such as alkyl—Al(O—alkyl)$_2$ or alkyl—Al(Hal)$_2$, wherein Hal preferably stands for chlorine or bromine.

The specified alkyl-aluminum compounds may likewise be used in the form of their etherates.

The process of the invention can be accomplished in the absence of solvents and in the presence of all solvents which are inert under the reaction conditions. Solvents of this type are aliphatic hydrocarbons, for example pentane, n-hexane, cyclohexane, octane, the mixtures thereof, aromatic hydrocarbons such as benzene and toluene, as well as ethers such as $\beta$-diethyl ether and halogenated hydrocarbons with such a number of halogen substituents that they do not react with the aluminum alkyl compound, for example methylene chloride, dichloroethane or chlorobenzene. It is preferable to use a solvent which can be readily separated from the reaction product.

The reactants are used in equivalent amounts or one of them is used in excess. The reaction is advantageously carried out in a manner such that the cyanogen halide is added in the same measure as it is reacted. At the temperatures defined above the reaction is normally carried out without the application of superatmospheric pressure. However, the application of pressure is likewise possible.

It is of advantage to accomplish the reaction under an inert gas, for example a noble gas or pure nitrogen.

In a reaction according to the following scheme

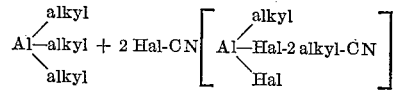

a sparingly soluble complex compound of the right-hand formula precipitates.

As indicated above, the nitrile is liberated by means of water, oxygen, air or $SO_2$

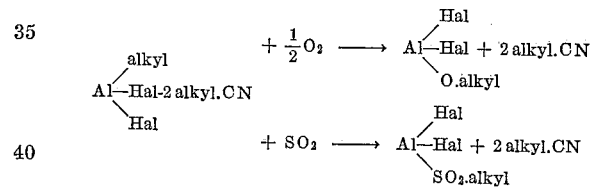

In this stage of the process the nitriles can be readily separated by distillation or extraction. The remaining substance, for example the alcoholate or sulfinate, is processed according to known methods.

The products obtained by the process of the invention are known nitriles and nitrile mixtures which may be reduced to amines and then used as cationic detergents or which may serve as disinfectants in the form of their quaternary ammonium compounds.

The following examples serve to illustrate the invention but they are not intended to limit it thereto, the parts being by weight unless otherwise stated.

*Example 1.—Propionitrile*

A solution of 114 parts of triethyl aluminum in 450 parts by volume of n-hexane was filled with the exclusion of air into a 4 liter stirring flask provided with thermometer, dropping funnel and reflux condenser. The dropping funnel and reflux condenser were maintained at $-25°$ C. by circulating methylene chloride.

A cooled solution of 380 parts of cyanogen chloride in 900 parts by volume of n-hexane was added slowly, while rapidly stirring. The reflux temperature was 60–

63° C. A sparingly soluble oily complex compound separated, which contained the propionitrile in bound form

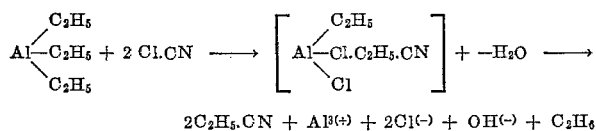

$$2C_2H_5.CN + Al^{3(+)} + 2Cl^{(-)} + OH^{(-)} + C_2H_6$$

For removing unreacted aluminum-organic compounds the reaction mixture was dropped into water at room temperature.

The reaction mixture was subjected to an azeotropic distillation whereby the propionitrile was obtained in a yield of 67%.

Example 2.—Perlargonitrile 366 parts of aluminum-tri-n-octyl were transferred under a protective gas into an apparatus as described in Example 1. A moderate current of gaseous cyanogen chloride was introduced until reflux occurred.

The reaction product was added in small portions to 500 parts of water, the water in-soluble substance was separated and washed twice, each time with 100 parts by volume of aqueous saturated sodium bicarbonate solution, dried with sodium sulfate and subjected to distillation.

The yield of pure perlargonitrile corresponded to 62% of the theory.

Example 3.—Tridecyl nitrile 534 parts of tri-n-dodecyl aluminum were transferred under a protective gas into the apparatus defined in Example 1. Gaseous cyanogen chloride was added. The reaction temperature amounted to 40–50° C. As soon as the cyanogen chloride reflux became more intense, the addition of gaseous cyanogen chloride was interrupted and the equivalent amount of $SO_2$ was introduced while cooling. The reaction product was then poured on to 500 parts of ice and the separated tridecyl nitrile was subjected to distillation after having been dried.

The yield of pure tridecyl nitrile amounted to 66%.

Example 4.—Propionitrile 188 parts of aluminum triethyl diethyl etherate were transferred, with the exclusion of air, into an apparatus as described in Example 1 and a solution of 380 parts of cyanogen chloride in 600 parts by volume of diethyl ether was dropped in. When the reaction was complete the diethyl ether was distilled off, the residue was dropped into water at room temperature and subjected to an azeotropic distillation.

The yield of propionitrile amounted to 66%.

Example 5.—Nitrile mixture A 450 parts of an aluminum-organic growth product having 10 carbon atoms on the average was filled into an apparatus as described in Example 1. Cyanogen chloride gas was introduced at 40° C. until a distinct reflux could be observed. Then $SO_2$ was introduced into the reaction mixture while cooling. The reaction mixture was poured on to 500 parts of ice and the water-insoluble portions were subjected to a fractional distillation in known manner.

A mixture of nitriles with an odd number of carbon atoms was obtained including propionitrile and $C_{17}$ nitrile having a Poisson's distribution corresponding to that of the growth product.

Example 6.—Nitrile mixture B 814 parts of an aluminum organic growth product having a medium carbon number of 18 was transferred into a reaction apparatus as described in Example 1 and gaseous cyanogen chloride was introduced at 50° C. until a distinct reflux could be observed. $SO_2$ was then introduced while cooling. The reaction mixture was extracted with ether, the ethereal solution was washed with 250 cc. of 5% hydrochloric acid, 250 cc. of saturated sodium bicarbonate solution, three times with 100 cc. of water and finally dried with $Na_2SO_4$. The ether was removed by distillation.

The yield of reaction product amounted to 505 grams, corresponding to 60% of the theory. The mixture contained 4.8 to 5.0% by weight of nitrogen. The nitrogen content to be expected from the medium molecular weight of the growth product was 4.87% by weight.

Example 7.—Nitrile mixture C 484 parts of an aluminum-organic growth product having an average number of carbon atoms of 11 (made from tripropyl aluminum and ethylene) was transferred into the apparatus as described in Example 1 and cyanogen chloride was introduced at 40° C. until a distinct reflux could be observed. $SO_2$ was then introduced while cooling. The reaction mixture was poured on to 500 parts of ice and the water-insoluble portions were subjected to a fractional distillation in known manner. A mixture of nitriles with even carbon numbers was obtained including butyronitrile and $C_{18}$ nitrile having a Poisson's distribution corresponding to that of the growth product.

Example 8.—Propionitrile 127 parts of $Al(C_2H_5)Cl_2$ were transferred under a protective gas into an apparatus as described in Example 1. 327 parts of cyanogen bromide were dropped in. When the reaction was terminated the reaction product was decomposed by dropping it into water at room temperature and then subjected to an azeotropic distillation.

The yield of propionitrile amounted to 42%.

Example 9.—Propionitrile 146 parts of monoethyl aluminum diethylate $$[Al(C_2H_5)(OC_2H_5)_2]$$

were transferred under a protective gas into the apparatus as described in Example 1. A moderate current of cyanogen chloride was introduced until a distinct reflux could be observed. Subsequently 500 parts of water were added at room temperature.

By azeotropic distillation with water propionitrile was obtained in a yield of 64%, calculated on the ethyl group present in the starting product.

Example 10.—Isovalerinitrile 142 parts of aluminum diisobutyl hydride $$[Al(i-C_4H_9)_2H]$$

were transferred under a protective gas into the apparatus as described in Example 1 and cyanogen chloride was introduced until a distinct reflux could be observed. The reaction product was dropped into water, filtered and extracted with $CH_2Cl_2$. After having evaporated the solvent the reaction product was obtained in a yield of 31%.

We claim:

1. A process for the manufacture of alkyl nitriles, wherein an alkyl-aluminum compound of the formula

in which alkyl stands for an alkyl group having 1 to 24 carbon atoms, X stands for a member of the group consisting of alkyl radicals having 1 to 24 carbon atoms, a hydrogen atom, a chlorine or bromine atom and an alkoxy group having 1 to 4 carbon atoms, and Y stands for a member of the group consisting of alkyl radicals having 1 to 24 carbon atoms and a chlorine or bromine atom, is reacted with a cyanogen chloride or bromide at a temperature in the range of from −10° C. to +120° C., and the nitrile thus formed is isolated.

2. A process for the manufacture of alkyl nitriles as claimed in claim 1, wherein the alkyl aluminum compound is reacted with a cyanogen chloride or bromide under an inert gas.

3. A process for the manufacture of alkyl nitriles as claimed in claim 1, wherein the nitrile formed is liberated from its complex compound in the reaction product by means of a member of the group consisting of water, oxygen, air and $SO_2$.

4. A process for the manufacture of alkyl nitriles as claimed in claim 1, wherein the nitrile formed is liberated from its complex compound in the reaction product by addition thereof to water.

5. A process for the manufacture of alkyl nitriles as claimed in claim 1, wherein the reaction between said alkyl aluminum compound and said cyanogen chloride or bromide is carried out at a temperature in the range of from $+10°$ C. to $+80°$ C.

6. A process as defined in claim 1, wherein the nitrile is liberated from its complex compound in the reaction product by addition thereof to ice.

No references cited.

CHARLES B. PARKER, *Primary Examiner.*